US008275161B2

(12) United States Patent
Fischer et al.

(10) Patent No.: US 8,275,161 B2
(45) Date of Patent: Sep. 25, 2012

(54) HEARING DEVICE EMPLOYING SIGNAL PROCESSING BASED ON DESIGN-RELATED PARAMETERS AND CORRESPONDING METHOD

(75) Inventors: Eghart Fischer, Schwabach (DE); Peter Nikles, Erlangen (DE); Erika Radick, Nürnberg (DE); Benjamin Schmidt, Nürnberg (DE); Christian Schmitt, Grossenseebach (DE); Erwin Singer, Eckental (DE); Cornelia Wiedenbrüg, Spardorf (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 960 days.

(21) Appl. No.: 12/218,489

(22) Filed: Jul. 15, 2008

(65) Prior Publication Data

US 2009/0022345 A1 Jan. 22, 2009

Related U.S. Application Data

(60) Provisional application No. 60/961,349, filed on Jul. 20, 2007.

(30) Foreign Application Priority Data

Jul. 20, 2007 (DE) ......................... 10 2007 033 896

(51) Int. Cl.

| | |
|---|---|
| ***H04R 25/00*** | (2006.01) |
| ***H04R 1/02*** | (2006.01) |
| ***H04R 3/00*** | (2006.01) |
| ***G06F 19/00*** | (2011.01) |
| ***G06F 17/50*** | (2006.01) |

(52) U.S. Cl. ............ 381/313; 381/91; 381/92; 381/322; 700/119; 700/121; 703/1

(58) Field of Classification Search ........................ None
See application file for complete search history.

(56) References Cited

U.S. PATENT DOCUMENTS

| | | | | |
|---|---|---|---|---|
| 5,463,694 | A | 10/1995 | Bradley et al. | |
| 6,879,697 | B2 | 4/2005 | Tøpholm | |
| 7,010,134 | B2 | 3/2006 | Jensen | |
| 7,467,022 | B2 * | 12/2008 | Bhagwat et al. | 700/98 |
| 7,933,423 | B2 * | 4/2011 | Baekgaard Jensen et al. | 381/312 |
| 7,949,145 | B2 * | 5/2011 | Bachler et al. | 381/322 |
| 2006/0233384 | A1 | 10/2006 | Bachler | |
| 2007/0014419 | A1 * | 1/2007 | Steele | 381/92 |
| 2007/0245721 | A1 | 10/2007 | Colignon | |
| 2008/0260189 | A1 * | 10/2008 | Schobben | 381/313 |

FOREIGN PATENT DOCUMENTS

| | | | |
|---|---|---|---|
| DE | 44 98 516 | C2 | 7/1997 |
| WO | 0065873 | A1 | 11/2000 |
| WO | WO 0228140 | A2 | 4/2002 |
| WO | WO 2007052185 | A2 | 5/2007 |
| WO | WO2007052185 | A2 * | 5/2007 |

* cited by examiner

*Primary Examiner* — Hoang-Quan Ho

(57) ABSTRACT

For enabling fast, customer-specific and precise matching of a hearing device's directional characteristic, a hearing device having a signal processing unit for performing a processing algorithm is provided, with at least one design-related parameter of the hearing device having been made available to the signal processing unit and with the signal processing unit performing the processing algorithm based on the design-related parameter of the hearing device. It should be considered as especially advantageous in the case of the inventive hearing device that a processing algorithm can be performed particularly precisely and customer-specifically based on the provided design-related parameters of the hearing device.

18 Claims, 2 Drawing Sheets

HEARING DEVICE EMPLOYING SIGNAL PROCESSING BASED ON DESIGN-RELATED PARAMETERS AND CORRESPONDING METHOD

CROSS REFERENCE TO RELATED APPLICATIONS

The present application claims the benefit of a provisional patent application filed on Jul. 20, 2007, and assigned application No. 60/961,349. The present application also claims the benefit of a German application No. 10 2007 033 896.3 filed Jul. 20, 2007. Both of the applications are incorporated by reference herein in their entirety.

FIELD OF THE INVENTION

The present invention relates to a hearing device having a signal processing unit for performing a processing algorithm. The present invention relates further to a corresponding method for performing a processing algorithm of a hearing device. What is in particular understood here by the term hearing device is a hearing aid, although other wearable acoustic devices are also encompassed within that term.

BACKGROUND OF THE INVENTION

Hearing aids are wearable hearing devices that serve to assist hearing-impaired persons. Hearing aids exhibiting different structural designs such as behind-the-ear (BTE), in-the-ear (ITE) and concha hearing aids etc. are provided for meeting individual requirements that are many in number. The hearing aids cited by way of example are worn on the outer ear or in the auditory canal, but the market also offers bone-conduction, implantable and vibrotactile hearing aids in the case of which impaired hearing is stimulated either mechanically or electrically.

Hearing aids basically have as their essential components an input converter, an amplifier, and an output converter. The input converter is as a rule a sound receiver, for example a microphone, and/or an electromagnetic receiver, for example an induction coil. The output converter is implemented usually as an electroacoustic transducer, for example a miniature loudspeaker, or as an electromechanical converter, for example a bone-conduction earphone. The amplifier is customarily integrated in a signal processing unit. This basic structure is shown in FIG. 1 using a behind-the-ear hearing aid as an instance. Built into a hearing aid housing 1 for wearing behind the ear are one or more microphones 2 for receiving ambient sound. A signal processing unit 3 that is likewise integrated in the hearing aid housing 1 processes the microphone signals and amplifies them. The output signal of the signal processing unit 3 is conveyed to a loudspeaker or earphone 4 that feeds out an acoustic signal. The sound is conveyed to the hearing aid wearer's eardrum possibly via a sound tube secured in the auditory canal by means of an otoplastic material. The hearing aid and in particular the signal processing unit 3 are powered by a battery 5 likewise integrated in the hearing aid housing 1.

The interest in the present instance focuses on in-the-ear hearing aids where a plurality of microphones are employed for receiving sound signals. Using a plurality of microphones will ensure a directionality for the directional characteristic, which is to say a directional effect for the hearing aid.

Individually shaped shells of in-the-ear hearing aids can be produced especially quickly using what is termed rapid shell manufacturing (RSM) that employs electronic data indicating the shape of the shells. Microphones are for example positioned on a faceplate in the case of in-the-ear hearing aids. The necessary positioning data of the microphones, such as the distances between the microphone outputs, is made available to the RSM software. Because, though, a hearing aid shell is shaped individually and when worn is also oriented in a manner specific to the auditory canal, the faceplate is also oriented individually. How the microphones are positioned directly affects their directionality. The positioning data for any particular type of faceplate is, though, as a rule predefined on a non-customer-specific basis.

The publication DE 44 98 516 C2 discloses a gradient directional microphone system in which no more than three microphones are provided and a gradient order of an output signal referred to a common axis is at least two gradient orders higher than that of each of the microphones. In said gradient directional microphone system, a distance between two adjacent microphones is also taken into account.

The publication U.S. Pat. No. 6,879,697 B2 discloses a method for manufacturing a hearing aid including a hearing aid shell and a faceplate. The hearing aid is therein manufactured using CAD/CAM models.

SUMMARY OF THE INVENTION

The object of the present invention is hence to individually match the directional characteristic of a hearing device whose shell is manufactured in particular automatically.

Said object is achieved according to the invention by means of a hearing system having a hearing device including a signal processing unit for performing a processing algorithm, and by means of a production control device for providing at least one design-related parameter of the hearing device, with the signal processing unit performing the processing algorithm based on the at least one design-related parameter of the hearing device or on a control value obtained therefrom and with the at least one design-related parameter of the hearing device or the control value obtained therefrom having been made available to the signal processing unit by the production control device.

Also provided according to the invention is a method for performing a processing algorithm of a hearing device that includes a signal processing unit through a production control device's providing at least one design-related parameter of the hearing device, and through performing of the hearing device's processing algorithm by the signal processing unit based on the design-related parameter or on a control value obtained therefrom, with the at least one design-related parameter of the hearing device or the control value obtained therefrom being made available to the signal processing unit by the production control device.

Using design-related data or a control value obtained therefrom will advantageously enable a signal processing algorithm of the hearing device to be realized particularly quickly, precisely, and customer-specifically. It will in particular thereby be possible to perform specifically embodied processing algorithms which, but for the above parameters, could not be implemented at all or only by circuitous routes and by means of which the perceptibility of the sound signals can be significantly improved.

Preferably at least two microphones can receive a sound signal in the hearing device, with a distance between the at least two microphones as the design-related parameter of the hearing device or a control value obtained therefrom having been made available to the signal processing unit in order to perform preferably automated matching of a directional characteristic of the hearing device. That is because to achieve an optimum directional effect the distance between the microphones must be known to the algorithm since internal delays correlated therewith have to be set. Furthermore, for example the strength of the microphone noise occurring depends on the distance between the microphones, which in turn impacts on noise-suppression algorithms.

In a further advantageous embodiment variant an orientation angle of a straight line connecting the at least two microphones referred to a predefined straight line or plane as the design-related parameter of the hearing device or a control value obtained therefrom has been made available to the signal processing unit in order to perform matching of the hearing device's directional characteristic. The angle at which the microphones are arranged relative to the hearing device wearer's horizontal viewing direction allows conclusions to be drawn about the maximum achievable strength of the directional effect and hence likewise allows parameterizing that is optimally matched to that design-dependent angle.

Faster individual matching of the hearing device's directional characteristic is possible thanks to these advantageous embodiments of the inventive hearing device because its design-related parameters that are used for matching the directional characteristic will already have been made available before it is worn. Especially precise automated matching of the directional characteristic will furthermore be ensured owing to the design-related parameters such as the distance between the microphones and the orientation angle.

The preferred embodiment variants presented with reference to the inventive hearing device and the advantages they offer hold true analogously, as far as can be applied, for the inventive method also.

BRIEF DESCRIPTION OF THE DRAWINGS

The present invention will now be explained in more detail with reference to the attached drawings, in which.

DETAILED DESCRIPTION OF THE INVENTION

Figure 1:
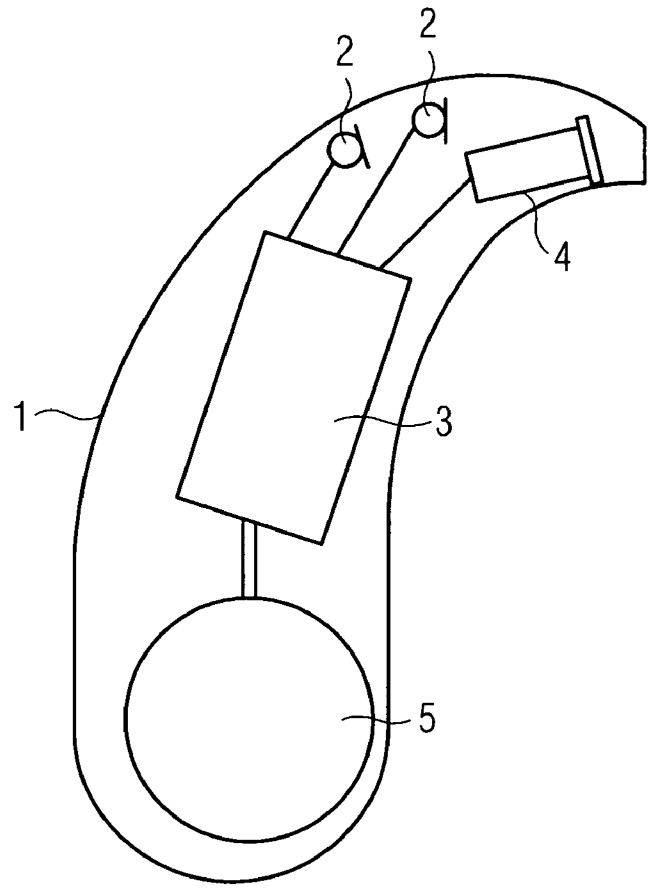
FIG 1 (Prior art)
FIG. 1 is a schematic showing the structure of a behind-the-ear hearing aid.
Figure 2:
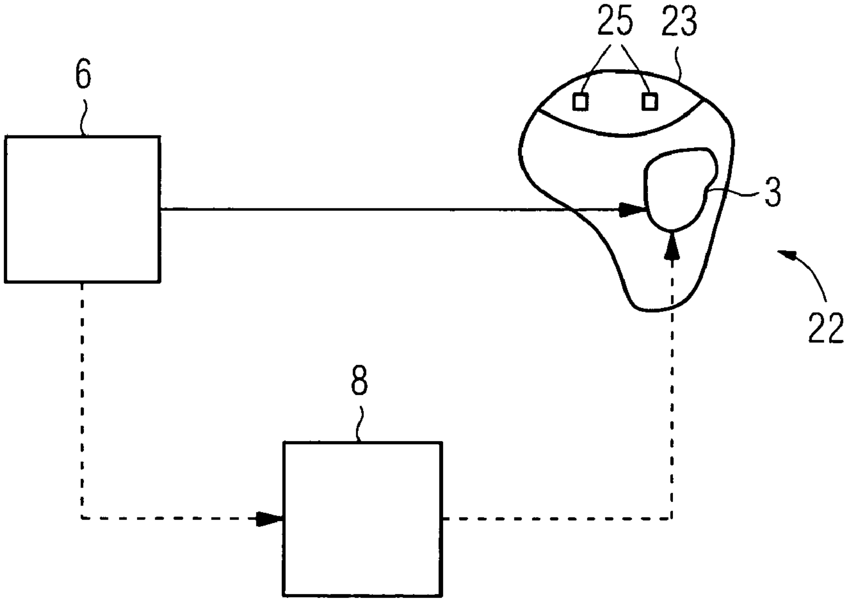
FIG. 2 is a schematic showing an inventive hearing device, RSM software, and matching software according to an exemplary embodiment.

In an embodiment variant shown in FIG. 2 a hearing aid 22 is produced using rapid shell manufacturing (RSM) software 6. The hearing aid 22 includes a faceplate 23 provided with a plurality of microphone holes 25 for microphones 2 behind them. The hearing aid 22 further has a signal processing unit 3 that processes the sound signals received by the microphones 2. A directionality of the directional characteristic of the hearing aid 22 is achieved with the aid of the signal processing unit 3 by driving the microphones 2 with respect to phase. The major lobe of the directional characteristic will turn if the phase displacement between the signals of the microphones 2 is changed so that a directional effect of the hearing aid 22 in a desired direction can be ensured.

Spatial parameters of the microphone holes 25 must be known to the signal processing unit 3 for performing precise matching of the directional characteristic. Said spatial parameters which are different for each individually shaped hearing aid 22 are established during the development phase of the hearing aid 22 and stored in or for the RSM software 6. The basic idea here is to be able to perform precise, automated matching of the directional characteristic or of another algorithm of the hearing aid 22. For that purpose the spatial parameters of the microphone holes 25 as well as any further design-related parameters of the hearing aid 22 that are known to the RSM software 6 are stored in the hearing aid 22 and made available to the signal processing unit 3. The design-related parameters can hence be taken directly from the signal processing unit 3 of the hearing aid 22 for performing matching of the directional characteristic.

In another embodiment variant shown also in FIG. 2 the design-related parameters of the hearing aid 22 can be taken from the RSM software 6 and transferred to matching software 8 kept by an acoustician. If a user wearing the hearing aid 22 wishes to have the directional characteristic of his/her hearing aid 22 matched, then all the design-related parameters of his/her hearing aid 22 will be available at the acoustician's. The user can therefore have a personally suitable directional effect of his/her hearing aid set during a visit to the acoustician. That embodiment variant offers the advantage that the hearing aid 22 will not per se have to be encumbered by the design-related parameters.

Figure 3:
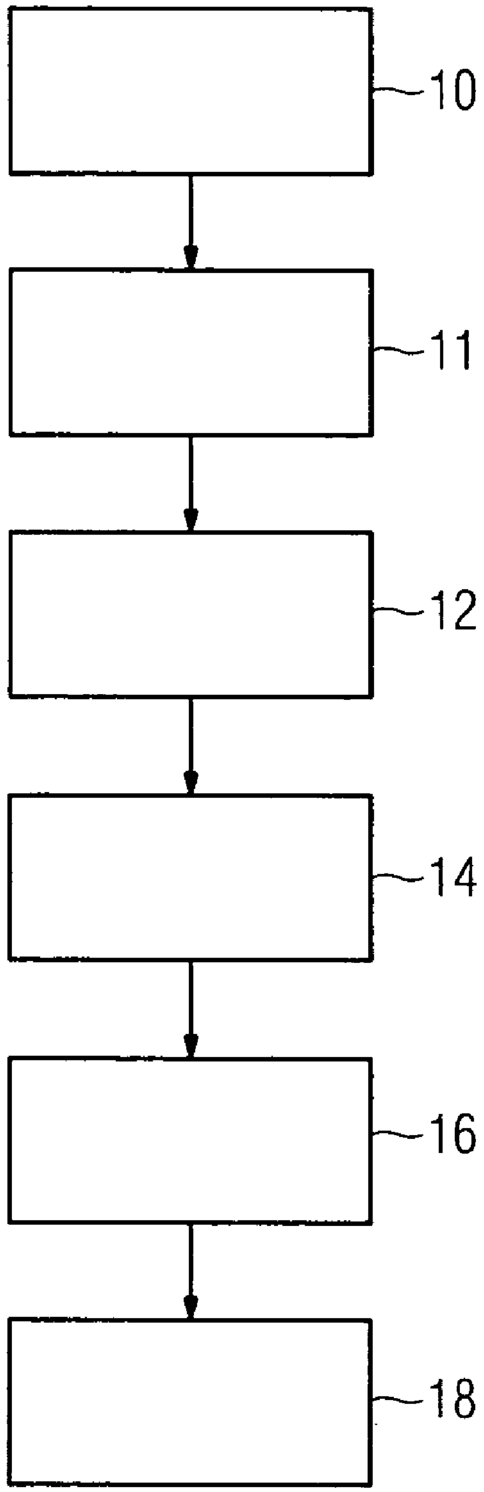
FIG. 3 is a schematic signal flowchart pertaining to an exemplary embodiment of an inventive method.

FIG. 3 shows the signal flowchart pertaining to a simple exemplary embodiment of a method for performing a processing algorithm of a hearing device such as a hearing aid 22. The method accordingly begins at step 10, after which at step 11 a hearing device 2 is first developed and manufactured using RSM software 6. The hearing device 22 is therein assigned a signal processing unit 3 serving to process the sound signals received with the aid of a plurality of microphones 2. The hearing device 22 is, as already mentioned above, provided with a faceplate 23 and microphone holes 25 arranged thereon for microphones 2. All design-related parameters of the hearing device 22 are, insofar as this is still necessary, determined at step 12 of the method. They include in particular the distances between the microphone holes 25 and also the orientation angles of the microphones 2 that can be used for calculating the directional characteristic of the hearing device 22. Said parameters are made available to the signal processing unit 3 of the hearing device 22 at step 14 of the method. The signal processing unit 3 of the hearing device 22 will then, on the basis of the design-related parameters, be able to perform one or more algorithms in terms particularly of the directional characteristic (step 16).

According to FIG. 3 the method ends at step 18.

The invention claimed is;

1. A hearing device system, comprising:

a production control device comprising shell manufacturing software having design-related data for positioning of microphones used for producing a hearing device, wherein the production control device provides a spatial parameter from the design related data arising from production that affects a directional characteristic of the hearing device; and a signal processing unit of the hearing device that performs a processing algorithm based on the spatial parameter received from the production control device.

2. The hearing device as claimed in claim 1, wherein the hearing device comprises two microphones for receiving a sound signal.

3. The hearing device as claimed in claim 2, wherein the spatial parameter comprises a distance between the two microphones.

4. The hearing device as claimed in claim 3, wherein the signal processing unit matches a directional characteristic of the hearing device based on the distance between the two microphones.

5. The hearing device as claimed in claim 2, wherein the spatial parameter comprises an orientation angle of a straight line connecting the two microphones.

6. The hearing device as claimed in claim 5, wherein the signal processing unit matches a directional characteristic of the hearing device based on the orientation angle of the straight line.

7. The hearing device as claimed in claim 5, wherein the straight line is a predefined straight line.

8. The hearing device as claimed in claim 1, wherein a control value is obtained from the spatial parameter.

9. The hearing device as claimed in claim 8, wherein the signal processing unit performs the processing algorithm based on the control value.

10. A method for performing a processing algorithm of a hearing device, comprising:

providing by a production control device a spatial parameter arising from production that affects a directional characteristic of the hearing device, the production control device comprising shell manufacturing software having design-related data for positioning of microphones used for producing the hearing device; and performing a processing algorithm by a signal processing unit of the hearing device based on the spatial parameter received from the production control device.

11. The method as claimed in claim 10, wherein the hearing device comprises two microphones for receiving a sound signal.

12. The method as claimed in claim 11, wherein the spatial parameter comprises a distance between the two microphones.

13. The method as claimed in claim 12, wherein the signal processing unit matches a directional characteristic of the hearing device based on the distance between the two microphones.

14. The method as claimed in claim 11, wherein the spatial parameter comprises an orientation angle of a straight line connecting the two microphones.

15. The method as claimed in claim 14, wherein the signal processing unit matches a directional characteristic of the hearing device based on the orientation angle of the straight line.

16. The method as claimed in claim 15, wherein the straight line is a predefined straight line.

17. The method as claimed in claim 10, wherein a control value is obtained from the spatial parameter.

18. The method as claimed in claim 17, wherein the signal processing unit performs the processing algorithm based on the control value.

* * * * *